Patented Apr. 16, 1940

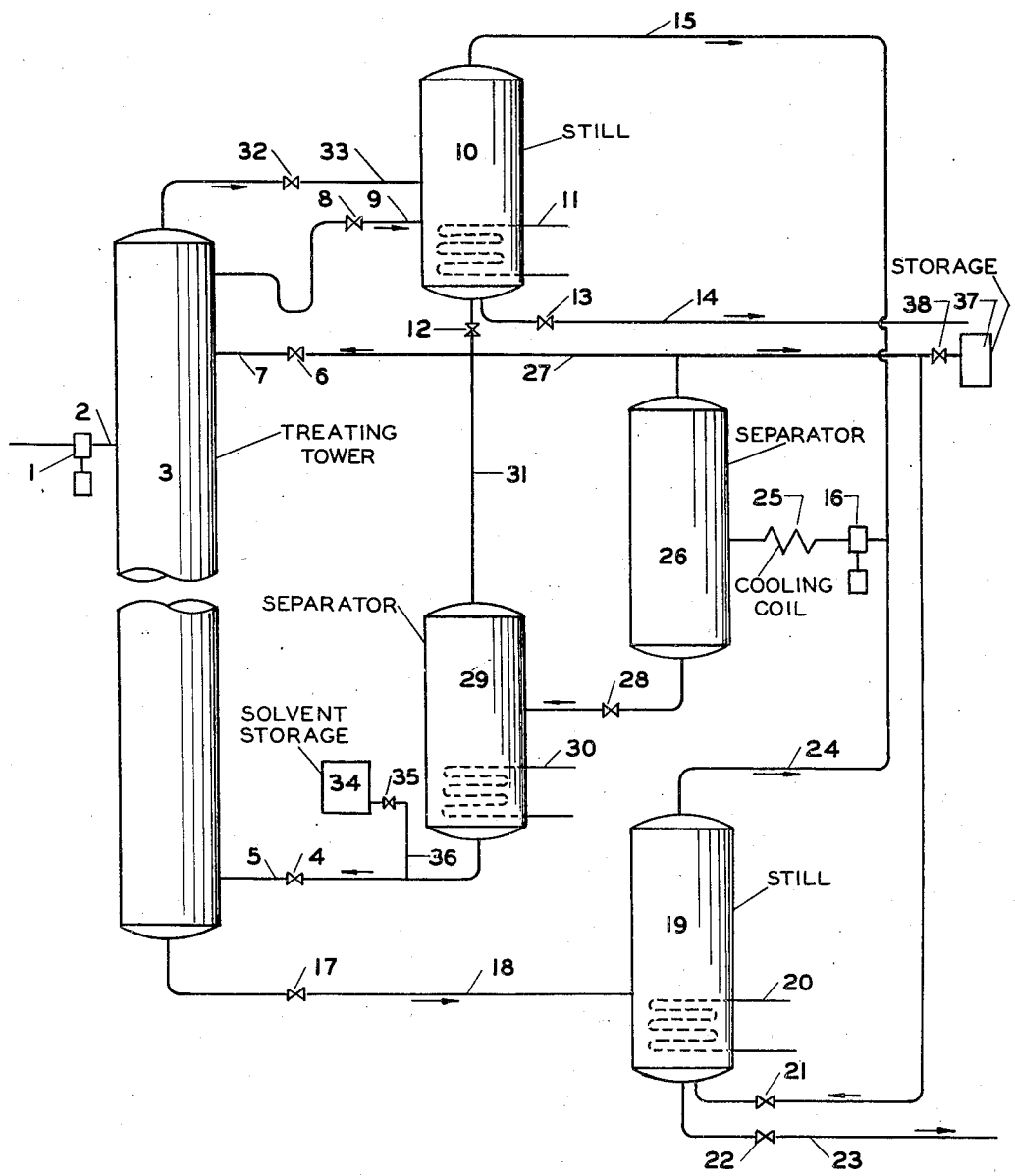

2,196,989

UNITED STATES PATENT OFFICE 2,196,989

PROCESS FOR TREATING HYDROCARBONS

Robert W. Henry and James V. Montgomery, Okmulgee, Okla., assignors to Phillips Petroleum Company, a corporation of Delaware Application July 11, 1938, Serial No. 218,652

2 Claims. (Cl. 196—13)

This invention relates to an improved process for treating lubricating oil. More specifically, it relates to a process of separating asphaltic and other undesirable bodies from oil by means of solvents and asphaltic precipitants. This invention is an extension of that disclosed in co-pending application, Serial No. 218,653 filed July 11, 1938.

In the aforementioned co-pending application, a process is disclosed for the separation of asphalt from asphaltic oil by means of liquefied normally gaseous hydrocarbon solvent, in particular, liquid propane, wherein asphaltic oil is commingled with solvent under sufficient pressure to maintain the solvent in liquid state, producing substantially an oil-solvent solution phase, and substantially an asphalt phase. The two phases separate, by difference in specific gravities, the asphalt settling and the oil solution rising in the apparatus. At top of the apparatus, the quantity of solvent in the oil-solvent solution is reduced by elevating the temperature in that section, thereby precipitating the oil and resinous material contained therein, the precipitated oily droplets settling by gravity and flowing in contact with and countercurrently to a paraffinic oil solvent solution and fresh solvent whereby the precipitated oily droplets are washed substantially free of paraffinic oil, leaving in the precipitated phase the asphaltic and resinous material. Then the total precipitated asphalt is separated from the oil-solvent solution and the residual solvent is separated from both the asphalt and oil, which produces a lubricating oil substantially free from asphalt and an asphalt substantially free of paraffinic oil.

The improved characteristics of de-asphalted oil over asphaltic oil are well known to those familiar with the art. Among others, some of the improvements realized by our process of de-asphaltizing oil are improved color, low carbon forming tendencies, and resistance to oxidation, all of which are desired qualities of finished lubricating oil.

We have found that the separation of asphaltic, colored, and other undesired components from asphaltic oil may be improved by the combined use of a light hydrocarbon solvent, such as liquid propane or liquid butane and one or more of a group of gases, such as methane, ethane, hydrogen, carbon dioxide, nitrogen, ammonia, etc., which are substantially chemically inert to both the solvent and mineral oil being used, and which are substantially soluble in the solvent used and substantially insoluble in mineral oil being treated, such gases acting as a precipitant for the oily material dissolved in the solvent.

By contacting asphaltic oil at a suitable temperature and pressure, with a propane solution of the oil, large portions of the oil will go into solution in the propane solution, the undissolved oil which consists largely of the more asphaltic, color imparting or resinous bodies will fall in small droplets through the propane solution toward the bottom of the apparatus. In so doing the droplets contact, and are washed by an ascending stream of propane solution which increases in propane content to nearly pure propane at the bottom of the apparatus. This ascending stream of propane continuously dissolves the more desirable portions of the oil droplets together with some of the undesired impurities. By introducing near the top of the apparatus, a precipitant gas, such as methane, under pressure into the oil-propane solution, the precipitant causes a continuous precipitation of oily impurities from the propane solution, the resulting droplets of oily material flow down the apparatus and are rewashed by the ascending stream of oil-propane solution and fresh propane, thereby redissolving the more desirable portions of the oily droplets. The precipitation of the oily impurities from the propane solution by precipitant gas or gases is effected by the principle of difference in solubilities of the various components in one another. The precipitant gas is substantially soluble in propane and substantially insoluble in the mineral oil undergoing treatment, particularly, the resinous impurities contained therein. When the precipitant gas under pressure is introduced into the solution of oil and propane, the precipitant gas dilutes the propane solution, thereby decreasing the solubility of the resinous impurities and desirable oil, and finally precipitates the impurities and a substantial portion of the oil from solution, leaving as solution, the precipitant gas, propane and portions of oil.

In this manner, both products, asphalt and desirable oil, are rectified from the apparatus and the sharpness of separation is controlled with the amount of refluxed material, the length of the apparatus, the efficiency of mixing, the temperature and pressure maintained in the apparatus, and the particular solvent and precipitant gas used. The improved color and relative freedom of contaminating materials of the finished oil resulting from this improved continuous rectifying system makes further refining easier or unnecessary.

Our process finds application in production of lubricating oils and especially in conjunction with crudes like Mid-Continent and California, where there is a considerable quantity of asphaltic material in the oil. However, our process is not restricted to the production of lubricating oil, as it may be employed in conjunction with any oil where it is desirable to obtain a separation of the oil from the asphaltic components.

Although propane is described herein as the solvent in the preferred embodiment of the present invention it will be understood that any material having a preferential solvent action relative to the paraffinic constituents and the asphaltic constituents of the oil can be used, and any desirable method of separating and re-using the solvent employed. In the term "asphaltic" the applicant intends to include color imparting, heavy resinous, and other undesirable bodies in the oil. The drawing shows the treating zone in the form of a tower and it is so described herein, but it will be obvious that the applicant's process does not depend on any particular form of apparatus.

Also in the discussion of our invention, methane will be used as an example as a precipitant gas, or other gases as described herein can be successfully employed.

It is, therefore, an object of our invention to separate asphaltic material from asphaltic oil.

A further object of our invention is to effect sharp separation of asphaltic material from asphaltic oil.

A further object is to treat mineral oil containing asphaltic components with a solvent in a treating zone to separate the asphaltic material from the oil with the aid of reflux oil flowing countercurrent to, and being continually washed by solvent; the reflux oil being precipitated from the solvent in the treating zone by means of a precipitant.

Other objects and advantages of our invention will be apparent from the following description of our invention, taken in conjunction with the drawing which illustrates a diagrammatic form of apparatus for successfully practicing the invention.

Referring to the drawing, the mineral oil to be de-asphaltized from a source not shown is introduced by pump 1 and line 2 into a continuous treating tower 3 wherein it is contacted, at suitable temperature and pressure, with a propane solution of desirable oil. This contacting may be of any known method as spraying or by mechanical mixer or by passing through packing material in the tower. By this means a large portion of the oil will go into solution in the propane solution, and the remainder, consisting of more asphaltic, color imparting, and resinous bodies will by gravity fall in small droplets through the propane solution toward the bottom of the tower. In so doing, the droplets contact, and are washed by an ascending stream of propane solution which increases in propane content to nearly pure propane at the bottom of the tower. This ascending steam of propane, introduced through valve 4 and line 5 continuously dissolves the more paraffinic portion of the droplets together with some of the asphaltic impurities. Near the top of the tower a precipitant gas, such a methane, is introduced under pressure in such a way that it dissolves in the propane solution. Due to the difference in solubility of the oil and oily impurities in propane and the precipitant gas methane, the oily materials being substantially soluble in propane and substantially insoluble in methane, the diluting of the solution with methane decreases the solubility of the oily material in the resulting solution. This causes a continuous precipitation of oily material from the propane solution, the resulting droplets of oily material flowing by gravity down the tower in contact with and countercurrently to an ascending solution of paraffinic oil and propane, thereby washing the oily droplets substantially free of paraffinic oil and leaving in the precipitated phase the less soluble asphaltic impurities. In this manner, both asphalt and desirable oil are rectified from the tower and the sharpness of separation of the two products, that is, asphalt and desirable oil is controlled by the reflux material, the length of the tower, the efficiency of mixing, the temperature and pressure maintained in the tower, and the solvent and gas used.

The rectified solution of oil substantially freed of its asphaltic impurities leaves the tower through valve 8 and line 9 and enters still 10 operating at pressure below that of tower 3, say at atmospheric pressure. Any excess gas not in solution may be released through valve 32 and line 33 to still 10. In still 10 the propane and dissolved gas are removed from the purified oil with the aid of heating coil 11. Gas from valve 12 may be used conveniently to aid the removal of propane from the purified oil, but this is not essential to the invention; the propane or similar solvent may be removed by heat combined with the reduction in pressure, or open steam may be used instead of gas to aid the evaporation. The purified oil freed from solvent is removed from still 10 through valve 13 and line 14 to storage not shown. The evaporated solvent flows through line 15 to compressor 16.

Similarly, the asphaltic materials from the bottom of tower 3 flow through valve 17 and line 18 to still 19 where the solvent is distilled off by means of heating coil 20, and with or without the aid of gas from valve 21. The asphaltic material is removed from bottom of still 19 through valve 22 and line 23 to storage not shown. Solvent vapors and gas, if any, flow from top of still 19 through line 24 to compressor 16.

Compressor 16 raises the pressure of the solvent vapor and gas from stills 10 and 19 to a point somewhat higher than the pressure maintained in tower 3. This compressed vapor and gas is cooled in coil 25 and introduced into primary separating tank 26 wherein the gas is largely separated from the liquefied solvent. The uncondensed gas leaves tank 26 through line 27 and is re-used in the top of tower 3, or to aid stripping in stills 10 and 19. Condensed solvent containing dissolved gas flows through valve 28 to separating tower 29 where the dissolved gas is driven out of the solvent by means of heating coil 30. This tower 29 is preferably a fractionating tower containing plates and reflux means not shown. The freed gas leaves through line 31 for re-use entering top of tower 3 through valve 6 and line 7, and the heated solvent under pressure passes through valve 4 and line 5 and is introduced into tower 3 near the bottom where it is thoroughly mixed with the asphaltic material by sprays or other suitable means. Make up propane passes from storage tank 34 through valve 35 and line 36 through valve 4 and line 5 to tank 3. Make up precipitant gas, methane, passes from storage tank 37 through valve 38 and line 27 through valve 6 and line 7 to top of tower 3. This process operates continuously.

The relative position at which line 2 enters tower 3 is selected for optimum operation, and may be at or near the point wherein the summation of the oil present in the two phases has characteristics similar to those of the entering oil.

It is to be understood that the above is merely illustrative of the principles and preferred embodiments of our improved invention of which many variations may be made by those skilled in the art without departing from the spirit thereof.

We claim:

1. A process for separating asphalt from oils containing the same comprising forming a stream of solvent, of the type having a preferential solvent effect for paraffinic materials relative to asphaltic materials in a treating zone having an initial and a final point with respect to said stream, introducing oil to be treated to said stream at a point intermediate said initial and final points resulting in a condition of equilibrium in which a solution of predominantly paraffinic material moves toward said final point and a precipitate of predominantly asphaltic material moves toward said initial point, and decreasing the relative solubility of said solution and dissolved material by the addition of a gas thereto adjacent said final point.

2. A process of separating asphalt from oils containing the same comprising forming a stream of solvent, of the type having a preferential solvent effect for paraffinic materials relative to asphaltic materials in a treating zone having an initial and a final point with respect to said stream, introducing oil to be treated to said stream at a point intermediate said initial and final points resulting in a condition of equilibrium in which a solution of predominantly paraffinic material moves toward said final point and a precipitate of predominantly asphaltic material moves toward said initial point, decreasing the relative solubility of said solution and dissolved material by the addition of gas thereto adjacent said final point, removing solution of paraffinic material from said treating zone, vaporizing the solvent from the solution so removed, and utilizing said gas as a stripping agent to secure thorough separation of the solvent and the paraffinic material.

ROBERT W. HENRY.
JAMES V. MONTGOMERY.